United States Patent
Abuaf et al.

[11] Patent Number: 5,960,632
[45] Date of Patent: *Oct. 5, 1999

[54] THERMAL SPREADING COMBUSTION LINER

[75] Inventors: Nesim Abuaf, Schenectady; Steven George Goebel, Clifton Park, both of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).
This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/912,529

[22] Filed: Aug. 18, 1997

Related U.S. Application Data

[63] Continuation of application No. 08/542,982, Oct. 13, 1995, Pat. No. 5,749,229.

[51] Int. Cl.[6] ..................................................... F02C 1/00
[52] U.S. Cl. ............................... 60/752; 60/753; 60/909; 428/632
[58] Field of Search ................................. 60/39.32, 752, 60/753, 754, 755, 756, 757, 758, 737, 266, 909; 431/353; 428/621, 632, 633

[56] References Cited

U.S. PATENT DOCUMENTS

| | | | |
|---|---|---|---|
| 2,924,537 | 2/1960 | Wallis et al. | 60/909 |
| 3,715,265 | 2/1973 | Allen et al. | 161/125 |
| 3,918,255 | 11/1975 | Holden | 60/39.65 |
| 4,273,824 | 6/1981 | McComas et al. | 428/256 |
| 4,338,380 | 7/1982 | Erickson et al. | 428/594 |
| 4,485,151 | 11/1984 | Stecura | 428/633 |
| 4,485,630 | 12/1984 | Kenworthy | 60/757 |
| 4,709,463 | 12/1987 | Moreno et al. | 60/752 |
| 4,916,906 | 4/1990 | Vogt | 60/757 |
| 4,942,732 | 7/1990 | Priceman | 60/753 |
| 5,009,070 | 4/1991 | Iizuka et al. | 60/753 |
| 5,174,368 | 12/1992 | Boury et al. | 60/267 |
| 5,528,904 | 6/1996 | Jones et al. | 60/757 |
| 5,601,932 | 2/1997 | Krum et al. | 428/632 |
| 5,749,229 | 5/1998 | Abuaf et al. | 60/752 |

*Primary Examiner*—Ted Kim
*Attorney, Agent, or Firm*—Patrick K. Patnode; Marvin Snyder

[57] ABSTRACT

A combustor liner includes an inner layer for facing combustion gases, and an opposite outer layer for facing a cooling fluid. The outer layer has a greater coefficient of thermal conductivity than the inner layer for reducing temperature gradients in the liner. In a preferred embodiment, the outer layer significantly reduces temperature gradients in the liner which are caused by the varying cooling ability of impingement cooling air jets for more uniformly cooling the combustor liner and reducing the maximum temperature thereof.

12 Claims, 1 Drawing Sheet

THERMAL SPREADING COMBUSTION LINER

This application is a continuation of application Ser. No. 08/542,982, filed Oct. 13, 1995, now U.S. Pat. No. 5,749,229.

BACKGROUND OF THE INVENTION

The present invention relates generally to gas turbine engines, and, more specifically, to combustor liners therein.

A gas turbine engine includes a compressor for compressing air which is suitably mixed with a fuel and channeled to a combustor wherein the mixture is ignited for generating hot combustion gases which are channeled to a turbine joined by a shaft to the compressor. The turbine rotates and extracts energy from the combustion gases for powering the compressor, as well as producing useful work for propelling an aircraft in flight for powering a load, such as an electrical generator.

The liner must be suitably protected from the hot combustion gases for achieving a useful life during service. The art of combustor liner cooling is crowded with various types of arrangements for channeling a portion of compressed air from the compressor as the cooling fluid. However, any compressed air diverted from the compressor which is not mixed with fuel to form the combustion gases decreases the overall efficiency of the engine. Combustor liner cooling techniques therefore attempt to maximize cooling of the liner with minimum cooling air.

One type of liner cooling uses a plurality of spaced apart film cooling holes which extend through the liner for channeling the cooling air along the inner surface of the liner as a film barrier against the heat generated by the combustion gases. Another type of liner cooling includes impingement holes in a shroud spaced radially above the liner which direct cooling air in discrete jets against the outer surface of the liner for providing enhanced cooling thereof.

Gas turbine engines may be made more efficient by increasing the turbine inlet temperature of the combustion gases, which, of course, further increases the difficulty of suitably cooling the combustor liner. Conventional thermal barrier coatings (TBC) have been developed and are applied to the inner surface of the combustor liner for providing thermal insulation against the hot combustion gases. The TBC therefore reduces the cooling air requirements, which may be used to decrease the amount of cooling air used for a given combustion gas temperature, or allows an increase in the combustion gas temperature for increasing efficiency of the engine.

Combustor liner cooling is also a significant concern in the development of low NOx combustors since film cooling air for example quenches the temperature of the combustion gases along the inside surface of the liner which creates undesirable exhaust emissions. Conventional low NOx combustors built for industrial power generation gas turbine engines include water or steam injection for ensuring suitably low level of exhaust emissions, in particular NOx, for meeting federally mandated (EPA) exhaust emissions limits. It is desirable to eliminate water or steam injection and the attendant complexity and cost associated therewith which, in turn, increases the difficulty of suitably cooling a combustor to be used for such dry, low NOx operation.

SUMMARY OF THE INVENTION

A combustor liner includes an inner layer for facing combustion gases, and an opposite outer layer for facing a cooling fluid. The outer layer has a greater coefficient of thermal conductivity than the inner layer for reducing temperature gradients in the liner. In a preferred embodiment, the outer layer significantly reduces temperature gradients in the liner which are caused by the varying cooling ability of impingement cooling air jets for more uniformly cooling the combustor liner and reducing the maximum temperature thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
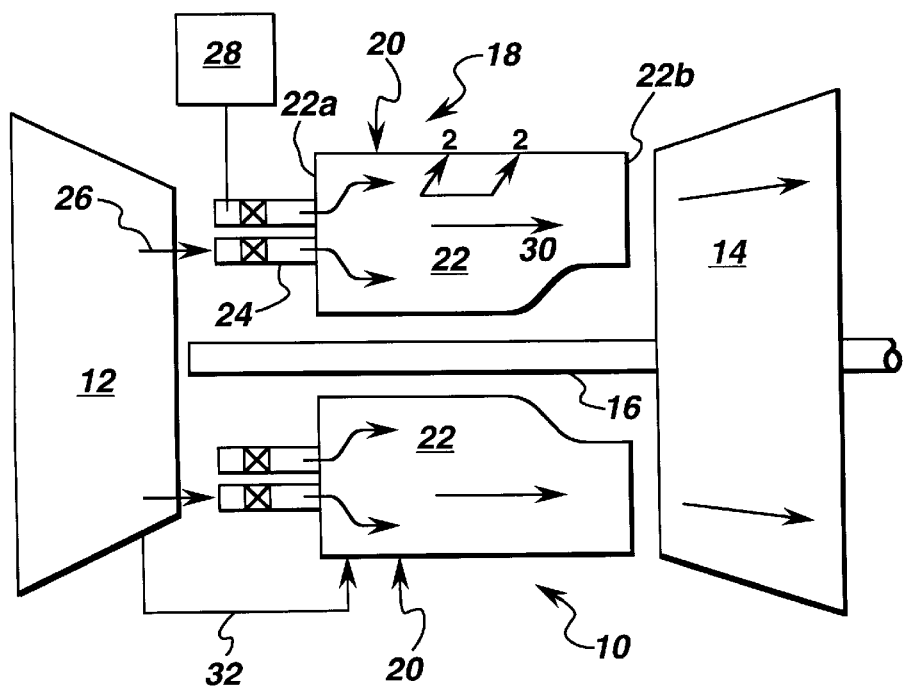
FIG. 1 is a schematic representation of an exemplary industrial, power generation gas turbine engine having a low NOx combustor including a liner in accordance with one embodiment of the present invention.

Illustrated schematically in FIG. 1 is an exemplary industrial, power generation gas turbine engine 10 having a compressor 12 joined to a turbine 14 by a rotor shaft 16 extending therebetween which are conventional in configuration and operation. Disposed axially between the compressor 12 and the turbine 14 is a combustor 18 in accordance with one embodiment of the present invention. In one exemplary form, the combustor 18 includes a plurality of combustor liners 20 in accordance with the present invention which are configured in the form of a plurality of adjoining burner cans defining respective combustion chambers 22. Each combustion chamber 22 has an inlet dome 22a at an upstream end adjacent to the compressor 12, and an outlet 22b at an opposite, axially downstream end adjacent to the turbine 14.

In accordance with the exemplary embodiment illustrated in FIG. 1, the combustor 20 is configured for dry, low NOx operation with each of the combustor liner cans further including a plurality of conventional tubular premixers 24 disposed in flow communication with a respective dome 22a. Each premixer 24 includes a conventional centerbody, swirler, and fuel injector, with compressor discharge air 26 being suitably channeled into the premixer 24 for use in the combustor 18.

Conventional means 28 are provided for supplying a liquid or gaseous fuel into the premixer 24 wherein it is premixed with the compressed air 26 and prevaporized prior to being channeled into the combustion chamber 22 wherein it is conventionally ignited for generating hot combustion gases 30 which are then discharged from the combustor through the several outlets 22b for flow into the turbine 14 which extracts energy therefrom. The turbine 14 powers the compressor 12 and produces output power typically used for powering an electrical generator (not shown). The combustor 18 is preferably configured and operated for effecting low NOx emissions from the combustion gases 30, and may be operated dry without the use of conventional water or steam injection for maintaining suitably low NOx emissions.

Figure 2:
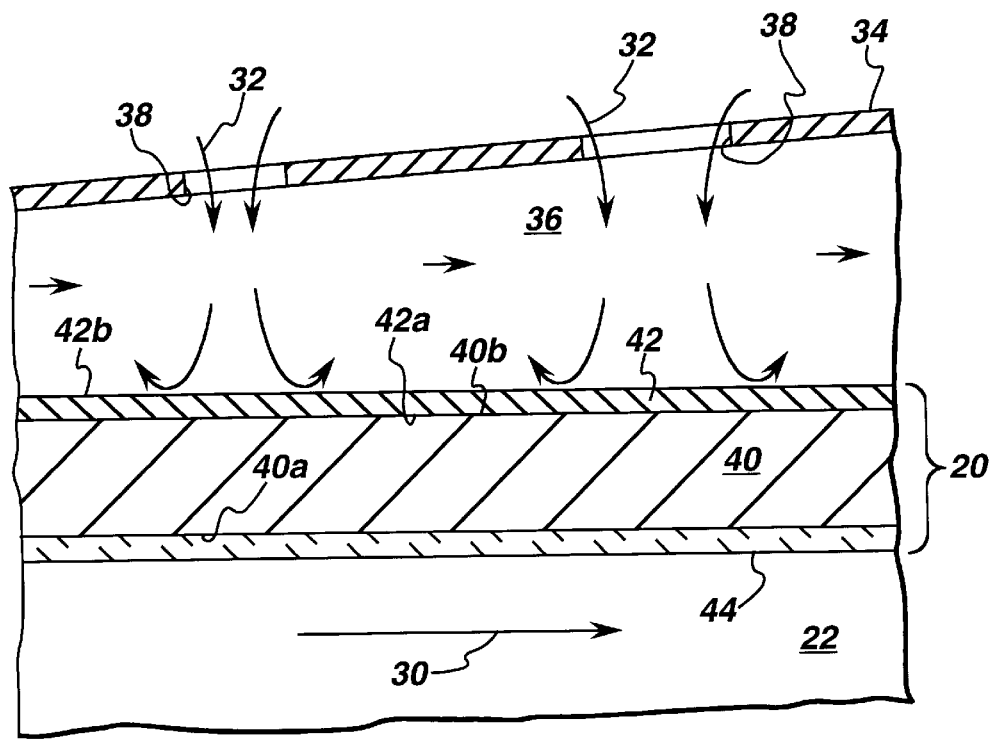
FIG. 2 is an elevational, cross-sectional view through a portion of the combustor liner illustrated in FIG. 1 and taken generally along line 2—2.

In order to cool the combustor liners 20, a portion of compressed air from the compressor 12 is conventionally bled therefrom and channeled to the liners as cooling air 32. In accordance with the present invention, any portion of the combustor liner 20 including its upstream and intermediate portions as well as its downstream or transition portions may be configured for reducing temperature gradients therein for more effectively utilizing the available cooling air 32. FIG. 2 illustrates an exemplary portion of the combustor liner 20 defining the combustion chamber 22 radially therein. In this exemplary embodiment, a conventional annular outer shroud 34 is spaced radially outwardly from the liner 20 to define a cooling annulus or channel 36 therebetween. The shroud 34 has a plurality of laterally spaced apart conventional impingement holes 38 distributed both circumferentially and axially for directing the cooling air 32 radially inwardly therethrough in impingement against the outer surface of the liner 20 for impingement cooling thereof.

The impingement holes 38 create jets of the cooling air 32 which have maximum cooling capability where they directly impinge the liner 20, with the cooling ability thereof decreasing laterally between adjacent ones of the jets being discharged from the impingement holes 38. In this way, the impingement holes 38 remove heat from the liner 20 more effectively directly under the cooling air jets then laterally therebetween.

In accordance with one embodiment of the present invention, the liner 20 includes a radially inner portion or layer 40 having a radially inner surface 40a which faces radially inwardly toward the combustion chamber 22 and gases 30. The liner 20 also has an integral, opposite, radially outer portion or layer 42 having an inner surface 42a which is integrally bonded to an outer surface 40b of the inner layer 40. The outer layer 42 has an outer surface 42b which faces the inside of the shroud 34 to define the cooling channel 36, and which is directly exposed to impingement by the cooling air 32.

In accordance with the present invention, the inner and outer layers 40, 42 are formed of different materials, with the outer layer 42 having a greater coefficient of thermal conductivity than that of the inner layer 40 for reducing temperature gradients in the liner 20. The outer layer 42 acts as a heat spreader for thermally conducting heat through the liner from hot regions to cooler regions. Since the jets of impingement cooling air 32 more effectively cool the liner directly below each of the impingement holes 38, the heat spreading outer layer 42 is effective for conducting heat from the hotter regions of the liner 20 laterally between adjacent ones of the impingement holes 38 to the regions directly below the impingement holes 38 so that the cooling air 32 may more effectively remove heat from the liner 20 and channel it away through the cooling channel 36.

The liner inner layer 40 may be formed of any conventional combustion liner material such as high temperature metals. The outer layer 42 may be formed of any suitable high thermal conductivity material which can withstand the combustor environment and be suitably bonded to the inner layer 40 for forming an integral, one-piece liner 20. In an exemplary embodiment, the outer layer 42 may be copper or nickel-aluminide which may be conventionally bonded to the inner layer 40 by plasma spray deposition for example. In one embodiment of the invention analyzed, the liner inner layer 40 had a thermal conductivity coefficient of 1.1 BTU/hr.in.F. Copper has a higher thermal conductivity coefficient of 17.0 BTU/hr.in.F, and Nickel-Aluminide also has a higher thermal conductivity coefficient of 4.5 BTU/hr.in.F. If practical, the coefficients of thermal expansion of the inner and outer layers 40, 42 should match for reducing thermal stress caused by differential expansion and contraction thereof.

In the preferred embodiment illustrated in FIGS. 1 and 2, the combustor 18 is configured for dry, low NOx operation and it is desirable that the liner 20 is imperforate, and therefore does not include conventional film cooling holes which would otherwise discharge the cooling air 32 inside the combustion chamber 22 which would quench the combustion gases 30 and increase exhaust emissions. However, the heat spreading outer layer 42 may be used in alternate combustor liner embodiments having film cooling holes if desired. In that case, the outer layer 42 will additionally be effective for conducting heat from the hotter regions of the liner toward the individual film cooling holes through which film cooling air is channeled and around which the liner is locally cooler.

Also in the exemplary embodiment illustrated in FIG. 2, the liner 20 further includes a conventional thermal barrier coating (TBC) 44 which is typically a ceramic, thermally insulating material suitably bonded to the inner surface 40a of the inner layer 40. Whereas the outer layer 42 is made of a suitable material for increasing thermal conductivity, the thermal barrier coating 44 is a thermally insulating material specifically selected for reducing thermal conductivity and thereby reducing the heat flux from the combustion gases 30 channeled into the liner 20. In the exemplary liner analyzed, the thermal barrier coating 44 had a thermal conductivity coefficient of 0.06 BTU/hr.in.F, which is substantially lower than the thermal conductivity coefficient of the inner layer 40 and lower even yet than the thermal conductivity of the outer layer 42.

A series of designs were analyzed including a simple 180 mil thick metal liner which experienced a temperature gradient along the liner which increased from a low value directly below the cooling air jet to a maximum value midway between adjacent impingement air jets. In a second design analyzed, a 40 mil thick thermal barrier coating was applied to the hot side of the liner which reduced the entire liner temperature about 100° F. from the cool region below the impingement jet to the hot region midway between impingement jets.

And, in another design analyzed, a 150 mil base metal was used with a 40 mil thermal barrier coating on the hot side and a 55 mil copper layer on the cold side. In this analysis, the resulting temperature gradient was substantially more uniform from the cold region under the impingement jet to the hot region between adjacent impingement jets, with the hot region having the lowest temperature of the three designs analyzed. The cool region had a temperature between that for the metal-alone design and the metal and thermal barrier coating design, with the heat spreading outer layer 42 being effective for conducting heat away from the hot region to the cool region. Since the maximum temperature in the three analyzed designs decreased substantially using the outer layer 42, the available cooling air 32 is more effectively used, and therefore less of the cooling air 32 may be used or an increase in combustion gas temperature may be effected instead.

Accordingly, the high thermal conductivity outer layer 42 effectively transfers heat from hot regions to cool regions for reducing temperature gradients of the combustion liner 20, and therefore more effectively utilizes the available cooling air 32.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A combustion liner for use and exposure within a hot gas environment, said liner comprising:

a thermal barrier layer for direct exposure to said hot gas, said thermal barrier layer having a first coefficient of thermal conductivity of about 0.6 BTU/(hr)(in.)(F.) at an average local temperature of said thermal barrier layer; and an inner structural layer having a second coefficient of thermal conductivity of about 1.1 BTU/(hr)(in.)(F.) at an average local temperature of said inner structural layer; and a thermal spreading layer for direct exposure to a cooling flow, said thermal spreading layer having a third coefficient of thermal conductivity in the range between about 4.5 BTU/(hr)(in.)(F) to about 17 BTU/(hr)(in.)(F) at an average local temperature of said thermal spreading layer;

wherein said thermal spreading layer has a greater coefficient of thermal conductivity at said average local temperature of said thermal spreading layer than each of said inner structural layer and said thermal barrier layer at respective average local temperatures of said inner structural layer and said thermal barrier layer, so as to thermally conduct heat through said liner from relatively hot regions to relatively cooler regions, and said thermal barrier layer has a coefficient of thermal conductivity at said average local temperature of said thermal barrier layer less than said inner structural layer at said average local temperature of said inner structural layer.

2. A combustion liner in accordance with claim 1 wherein said thermal spreading layer is selected from the group of materials consisting of copper and nickel-aluminide.

3. A combustion liner in accordance with claim 1 wherein said thermal spreading layer is bonded to said inner structural layer by plasma spray deposition.

4. A combustion liner in accordance with claim 1 wherein said thermal barrier layer comprises a thermal insulating material.

5. A combustion liner in accordance with claim 1, wherein said thermal barrier layer comprises a ceramic.

6. A combustion liner in accordance with claim 1, wherein said thermal spreading layer has a thickness of about 50 mils.

7. A gas turbine engine including a combustion liner for use and exposure within a hot gas environment, said liner comprising:

a thermal barrier layer for direct exposure to said hot gas, said thermal barrier layer having a first coefficient of thermal conductivity of about 0.6 BTU/(hr)(in.)(F) at an average local temperature of said thermal barrier layer;

an inner structural layer having a second coefficient of thermal conductivity of about 1.1 BTU/(hr)(in.)(F.) at an average local temperature of said inner structural layer; and a thermal spreading layer for direct exposure to a cooling flow, said thermal spreading layer having a third coefficient of thermal conductivity in the range between about 4.5 BTU/(hr)(in.)(F.) to about 17 BTU/(hr)(in.)(F.) at an average local temperature of said thermal spreading layer;

wherein said thermal spreading layer has a greater coefficient of thermal conductivity at said average local temperature of said thermal spreading layer than said inner structural layer and said thermal barrier layer at respective average local temperatures of said inner structural layer and said thermal barrier layer, so as to thermally conduct heat through said liner from relatively hot regions to relatively cooler regions, and said thermal barrier layer has a coefficient of thermal conductivity at said average local temperature of said thermal spreading layer less than said inner structural layer at said average local temperature of said inner structural layer.

8. A gas turbine engine in accordance with claim 7 wherein said thermal spreading layer is selected from the group of materials consisting of copper and nickel-aluminide.

9. A gas turbine engine in accordance with claim 8 wherein said thermal spreading layer is bonded to said inner structural layer by plasma spray deposition.

10. A gas turbine engine in accordance with claim 7, wherein said thermal barrier layer comprises a thermal insulating material.

11. A gas turbine engine in accordance with claim 7, wherein said thermal barrier layer comprises a ceramic.

12. A gas turbine engine in accordance with claim 7, wherein said thermal spreading layer has a thickness of about 50 mils.

* * * * *